United States Patent
Hirano et al.

(10) Patent No.: US 11,956,262 B2
(45) Date of Patent: Apr. 9, 2024

(54) ANOMALY DETECTION DEVICE AND ANOMALY DETECTION METHOD

(71) Applicant: Panasonic Intellectual Property Corporation of America, Torrance, CA (US)

(72) Inventors: Ryo Hirano, Osaka (JP); Takeshi Kishikawa, Osaka (JP); Yoshihiro Ujiie, Osaka (JP); Tomoyuki Haga, Nara (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 421 days.

(21) Appl. No.: 17/330,020

(22) Filed: May 25, 2021

(65) Prior Publication Data
US 2021/0281595 A1    Sep. 9, 2021

Related U.S. Application Data

(63) Continuation of application No. PCT/JP2020/024841, filed on Jun. 24, 2020.

(51) Int. Cl.
| | |
|---|---|
| *H04L 9/40* | (2022.01) |
| *G06F 21/31* | (2013.01) |
| *G06F 21/55* | (2013.01) |
| *H04L 67/12* | (2022.01) |
| *H04W 4/48* | (2018.01) |

(52) U.S. Cl.
CPC .......... *H04L 63/1425* (2013.01); *H04L 63/20* (2013.01); *H04L 67/12* (2013.01)

(58) Field of Classification Search
CPC ..... H04L 63/1425; H04L 63/20; H04L 67/12; H04L 2012/40215; H04L 63/1416; H04W 4/48; H04W 12/12
See application file for complete search history.

(56) References Cited

U.S. PATENT DOCUMENTS

| | | | | |
|---|---|---|---|---|
| 9,794,286 B2 * | 10/2017 | Otsuka | ................ | H04L 12/4625 |
| 2005/0180764 A1 * | 8/2005 | Koike | ................ | G03G 21/1882 |
| | | | | 399/12 |

(Continued)

OTHER PUBLICATIONS

Wang et al., "A Distributed Anomaly Detection System for In-Vehicle Network Using HTM," IEEE Access Year: 2018 | vol. 6 | Journal Article | Publisher: IEEE.*

(Continued)

*Primary Examiner* — Roderick Tolentino
(74) *Attorney, Agent, or Firm* — GREENBLUM & BERNSTEIN, P.L.C.

(57) ABSTRACT

An anomaly detection device (IDS ECU) includes a detection rule generator that monitors a communication establishment frame flowing over Ethernet in a communication establishment phase of service-oriented communication and that generates, for each communication ID, a detection rule including the communication ID written in the communication establishment frame and a server (or client) address written in the communication establishment frame; an anomaly detector that monitors a communication frame flowing over the Ethernet in a communication phase of the service-oriented communication and that, by referring to a detection rule that includes a communication ID written in the communication frame, detects the communication frame as an anomalous frame when a server (or client) address written in the communication frame differs from a server (or client) address included in the detection rule; and an anomaly notifier that provides a notification of an anomaly in response to the anomalous frame being detected.

11 Claims, 9 Drawing Sheets

(56) References Cited

U.S. PATENT DOCUMENTS

| | | | | |
|---|---|---|---|---|
| 2016/0294848 A1* | 10/2016 | Kantor | ............... | H04W 12/122 |
| 2017/0041161 A1* | 2/2017 | Kaku | ................... | H04L 12/437 |
| 2017/0359241 A1* | 12/2017 | Takada | ............... | H04L 12/4625 |
| 2019/0104204 A1* | 4/2019 | Kawakami | ............. | H04L 1/205 |
| 2020/0014758 A1* | 1/2020 | Kamiguchi | .......... | B60W 50/04 |
| 2020/0145251 A1* | 5/2020 | Hass | .................... | G06F 11/076 |
| 2021/0021615 A1* | 1/2021 | Go | ....................... | H04L 63/123 |
| 2021/0392109 A1* | 12/2021 | Hamada | ............. | H04L 63/1425 |

OTHER PUBLICATIONS

Marchetti et al., "Evaluation of anomaly detection for in-vehicle networks through information-theoretic algorithms," 2016 IEEE 2nd International Forum on Research and Technologies for Society and Industry Leveraging a better tomorrow (RTSI) Year: 2016 | Conference Paper | Publisher: IEEE.*

"SOME/IP Service Discovery Protocol Specification", https://www.autosar.org/fileadmin/user_upload/standards/foundation/19-11/AUTOSAR_PRS_SOMEIPServiceDiscoveryProtocol.pdf, pp. 1-91, retrieved Jun. 18, 2019.

N. Herold, et al., "Anomaly Detection for SOME/IP using Complex Event Processing", Noms, IEEE/IFIP Network Operations and Management Symposium, pp. 1-39, dated Apr. 29, 2016.

Official Communication issued in International Patent Application No. PCT/JP2020/024841, dated Sep. 1, 2020, along with an English translation thereof.

* cited by examiner

FIG. 4

| Communication ID | | Server count | Client count | Vehicle state | Service content |
|---|---|---|---|---|---|
| Service ID | Method ID | | | | |
| 0001 | 0001 | 1 | 2 | Ignition ON state | Camera image request |
| 0001 | 0002 | 1 | 5 | Network connection ON state and Parking state and Stop state | Software update request |
| 0002 | 0003 | 1 | 2 | Autocruise mode or Auto-parking mode | Steering wheel control command |
| 0003 | 0004 | 2 | 1 | Autocruise mode or Auto-parking mode or Human detection | Brake control command |
| 0004 | 0005 | 1 | 1 | - | Vehicle state |
| 0009 | 0010 | 1 | 1 | - | Gearshift change request |
| ... | | ... | ... | ... | ... |

FIG. 5

| Communication ID | | Service address | Client address | Communication establishment state |
|---|---|---|---|---|
| Service ID | Method ID | | | |
| 0001 | 0001 | X | A | ON |
| 0001 | 0001 | X | B | ON |
| 0001 | 0002 | X | A | OFF |
| 0001 | 0002 | X | B | OFF |
| 0001 | 0002 | X | C | OFF |
| 0001 | 0002 | X | D | OFF |
| 0001 | 0002 | X | E | OFF |
| 0002 | 0003 | X | A | ON |
| 0002 | 0003 | Y | B | OFF |
| 0003 | 0004 | Z | B | ON |
| 0003 | 0004 | X | B | ON |
| 0004 | 0005 | Z | F | ON |
| ... | ... | ... | ... | ... |
| 0009 | 0010 | T | A | ON |

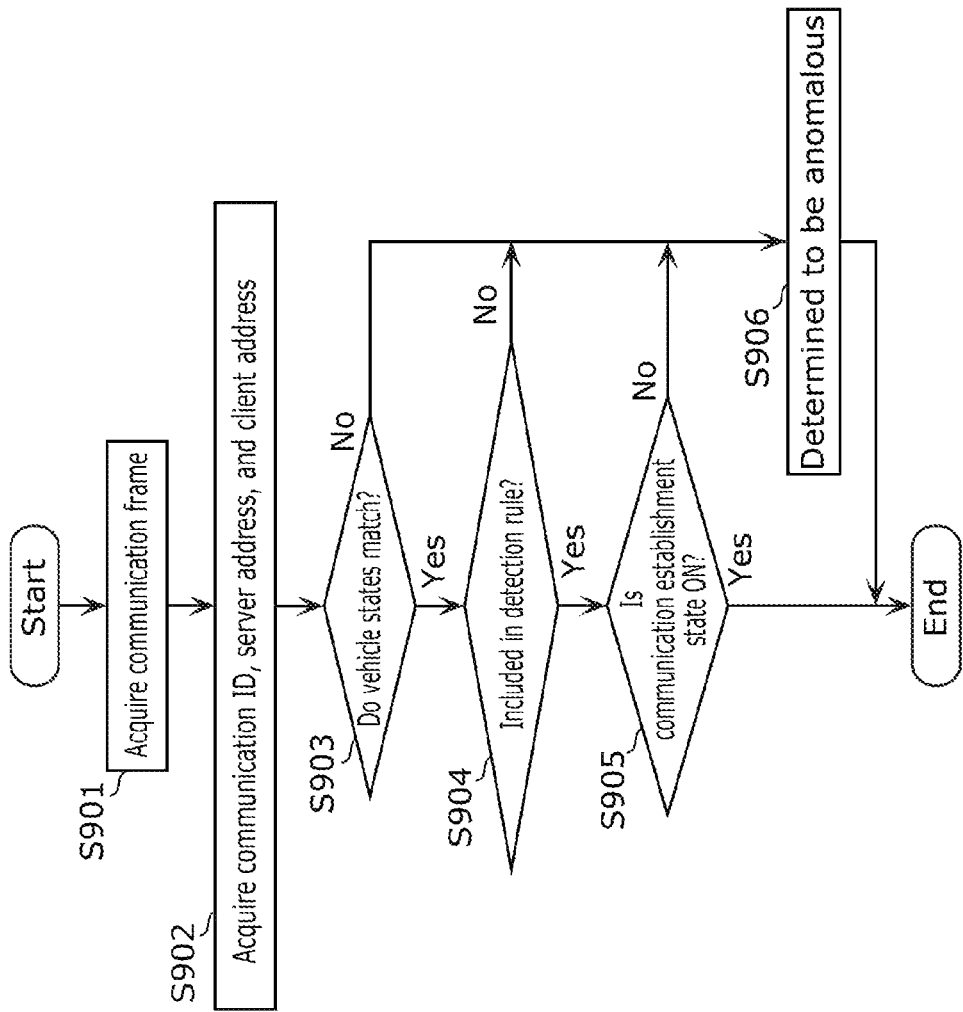

ANOMALY DETECTION DEVICE AND ANOMALY DETECTION METHOD

CROSS REFERENCE TO RELATED APPLICATIONS

This is a continuation application of PCT International Application No. PCT/JP2020/024841 filed on Jun. 24, 2020, designating the United States of America, which is based on and claims priority of PCT International Application No. PCT/JP2019/026722 filed on Jul. 4, 2019. The entire disclosures of the above-identified applications, including the specifications, drawings and claims are incorporated herein by reference in their entirety.

FIELD

The present disclosure relates to an anomaly detection device and an anomaly detection method for detecting anomalous communication in an in-vehicle network.

BACKGROUND

Nowadays, many devices called electronic control units (ECUs) are disposed in a system within an automobile. The network that connects these ECUs is called an in-vehicle network. There are many in-vehicle network standards. One of such in-vehicle network standards is Ethernet (registered trademark) defined by IEEE 802.3. In an advanced drive assist system or automatic driving, a massive amount of information, including sensor information acquired by a sensor such as a camera or a Light Detection and Ranging (LIDAR) or a dynamic map, needs to be processed. Therefore, the introduction of the Ethernet having a high data transmission rate is in progress. One of the communication protocols for the Ethernet is Scalable service-Oriented MiddlewarE over IP (SOME/IP). In the SOME/IP protocol, SOME/IP is called service-oriented communication because each node connected to the Ethernet determines the communication content based on the service ID written in the header. Moreover, SOME/IP includes an inter-node communication establishment phase called SOME/IP-Service Discovery (SD), and this inter-node communication establishment phase occurs before SOME/IP communication is started. If a given node stores therein the service ID of the service that the node is to use or the service ID of the service that the node can offer in advance in the communication establishment phase, that node can dynamically acquire the IP address and the MAC address of the node on the communicating end. This renders it unnecessary to set in advance the information, such as the IP address or the MAC address, that is dependent on the system environment, and this makes it possible to design the software that excels in portability with ease. Accordingly, the use of SOME/IP as the next-generation communication scheme is expected to grow.

CITATION LIST

Non Patent Literature

NPL 1: "SOME/IP, Publications, Specifications/Standards," [online], [retrieved Jun. 18, 2019], Internet <URL: http://some-ip.com/papers.shtml/>

NPL 2: N. Herold, et al., "Anomaly Detection for SOME/IP using Complex Event Processing," NOMS 2016, IEEE/IFIP Network Operations and Management Symposium, 2016

SUMMARY

Technical Problem

In the service-oriented communication, such as SOME/IP, if no security measure is taken, this may pose the following threat. Specifically, once one node is hacked, this node can maliciously transmit or receive a frame that includes the service ID that is supposed to be transmitted by this hacked node. Moreover, spoofing as another node different from the hacked node, the hacked node can establish illegitimate communication or stop legitimate communication by transmitting a frame that includes the service ID that is supposed to be transmitted by this other node.

In particular, an in-vehicle network involves some particularly important services concerning "traveling, turning, and stopping" of the vehicle. Therefore, it poses a great threat if these services can be controlled maliciously or can be stopped maliciously.

There are some measures against such threats. For example, the SOME/IP communication can be encrypted by use of Security Architecture for Internet Protocol (IPSec) or the like, or Non Patent Literature 2 discloses one measure.

In a case where IPSec is used, encrypting the communication by use of a key shared between nodes can prevent eavesdropping on the communication content.

However, if the key is shared by every ECU within the vehicle, once a specific ECU is hacked maliciously, the key also leaks, and this poses a problem in that illegitimate communication can be established.

Meanwhile, if different keys are used for different ECUs or if public keys are used, this problematically complicates the key management and leads to an increase in the processing overhead owing to the necessary encrypting and decrypting processing of the communication.

If IPSec is used as a security measure, the portability, which is an advantage of using SOME/IP, is lost.

According to the measure disclosed in Non Patent Literature 2, the receiver IP address and the sender IP address each corresponding to a service ID are set in advance as a normal rule in each communication frame of SOME/IP, and the communication frames are monitored. Then, any communication frame that does not follow the normal rule is detected as an anomalous frame.

However, information such as the IP address differs between different vehicle types or between different vehicles. Therefore, setting such information that is dependent on the system environment in advance leads to a problem in that the portability, an advantage of using SOME/IP, is reduced.

To address the existing problems, the present disclosure is directed to providing an anomaly detection device and so on that can help improve the safety of automobiles without sacrificing the portability of service-oriented communication.

Solution to Problem

To address the above problems, an anomaly detection device according to one aspect of the present disclosure is an anomaly detection device in an in-vehicle network system performing service-oriented communication via Ethernet (registered trade mark), and the anomaly detection device includes: a detection rule generator that monitors a communication establishment frame flowing over the Ethernet in a communication establishment phase of the service-oriented communication and that generates, for each communication ID, a detection rule including the communication ID written in the communication establishment frame and a server address or a client address written in the communication establishment frame; an anomaly detector that monitors a communication frame flowing over the Ethernet in a communication phase of the service-oriented communication and that, by referring to a detection rule that includes a communication ID written in the communication frame, detects the communication frame as an anomalous frame when a server address or a client address written in the communication frame differs from a server address or a client address included in the detection rule; and an anomaly notifier that provides a notification of an anomaly in response to the anomalous frame being detected.

Advantageous Effects

The present disclosure can help improve the safety of automobiles without sacrificing the portability of service-oriented communication.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 illustrates an example of an advance setting detection rule according to Embodiment 1 of the present disclosure.

FIG. 5 illustrates an example of a dynamic setting detection rule according to Embodiment 1 of the present disclosure.

FIG. 9 is a flowchart of the anomaly detecting process according to Embodiment 1 of the present disclosure.

DESCRIPTION OF EMBODIMENTS

Figure 1:
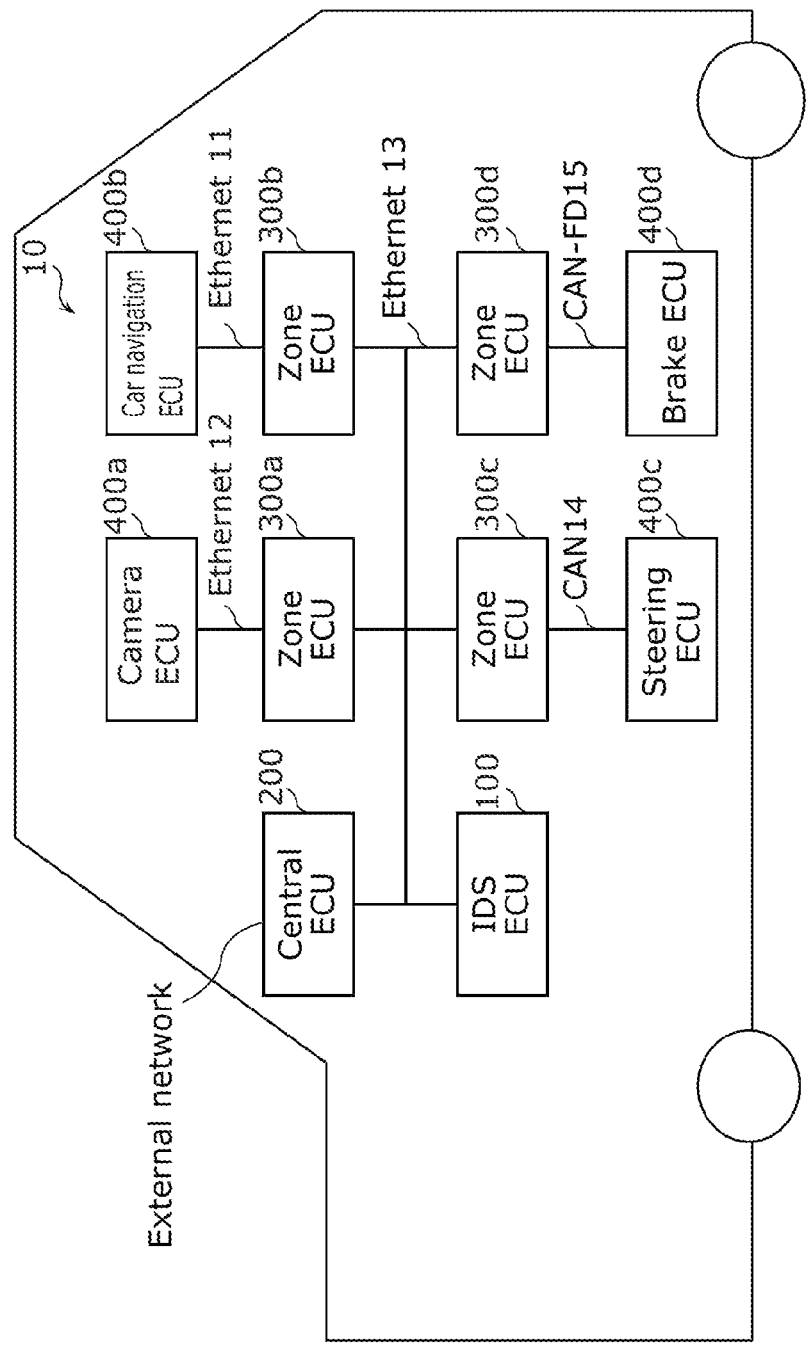
FIG. 1 is an overall configuration diagram of an in-vehicle network system according to Embodiment 1 of the present disclosure.

To address the above problem, an anomaly detection device according to one aspect of the present disclosure is an anomaly detection device in an in-vehicle network system performing service-oriented communication via Ethernet (registered trade mark). The anomaly detection device includes a detection rule generator, an anomaly detector, and an anomaly notifier. The detection rule generator monitors a communication establishment frame flowing over the Ethernet in a communication establishment phase of the service-oriented communication and generates, for each communication ID, a detection rule including the communication ID written in the communication establishment frame and a server address or a client address written in the communication establishment frame. The anomaly detector monitors a communication frame flowing over the Ethernet in a communication phase of the service-oriented communication and, by referring to a detection rule that includes a communication ID written in the communication frame, detects the communication frame as an anomalous frame when a server address or a client address written in the communication frame differs from a server address or a client address included in the detection rule. The anomaly notifier provides a notification of an anomaly in response to the anomalous frame being detected.

According to this configuration, a detection rule that includes the server address (e.g., the server IP address) or the client address (e.g., the client IP address) corresponding to the communication ID can be generated dynamically and used in the communication establishment phase without any IP address or the like being set in advance. Then, in the communication phase, any communication frame having an address different from the server IP address or the client IP address written in the detection rule can be determined to be an anomalous frame since that communication frame is a frame that has not undergone the legitimate communication establishment phase of the service-oriented communication. In this manner, an anomalous communication frame can be detected, and this can help improve the safety of automobiles without sacrificing the software portability that is one advantage of the service-oriented communication. As a result, if a maliciously hacked node, spoofing as another legitimate node, transmits a frame including a service ID that is supposed to be transmitted by another node to establish illegitimate communication or to stop legitimate communication, that frame can be detected as an anomalous frame. Moreover, the above configuration renders it unnecessary to configure the IP address or the like dependent on the system environment, and this can reduce the cost of software modification when this configuration is extended to another vehicle type or to another vehicle.

The detection rule generator may generate, for each of one or more communication IDs, a plurality of detection rules that include an identical communication ID and different server addresses or different client addresses. The anomaly detector may, by referring to a plurality of detection rules that include the communication ID written in the communication frame, detect the communication frame as an anomalous frame when the server address or the client address written in the communication frame differs from any of the server addresses or any of the client addresses included in the plurality of detection rules.

According to this configuration, a plurality of detection rules having one identical communication ID and different server addresses or different client addresses are generated. This makes it possible to prevent false detection even in a case where there are a plurality of servers that offer the same service owing to the system redundancy or where there are a plurality of clients that use the same service.

A detection rule may include a communication establishment state. The communication establishment state may be ON when a server corresponding to a server address included in the detection rule or a client corresponding to a client address included in the detection rule is in a state of performing communication concerning a service corresponding to a communication ID included in the detection rule. The communication establishment state may be OFF when the server corresponding to the server address included in the detection rule or the client corresponding to the client address included in the detection rule is not in a state of performing the communication concerning the service corresponding to the communication ID included in the detection rule. The detection rule generator may check a communication type written in the communication establishment frame. The detection rule generator may set, to ON, the communication establishment state included in the detection rule that includes a set of the communication ID and the server address written in the communication establishment frame or a set of the communication ID and the client address written in the communication establishment frame when the communication type is a service offer, a service subscription acknowledgment, a service search, or a service subscription. The detection rule generator may set, to OFF, the communication establishment state included in the detection rule that includes the set of the communication ID and the server address written in the communication establishment frame or the set of the communication ID and the client address written in the communication establishment frame when the communication type is a service offer stop or a service subscription stop. The anomaly detector may, by referring to the detection rule that includes the communication ID written in the communication frame, detect the communication frame as an anomalous frame when the server address or the client address written in the communication frame matches the server address or the client address included in the detection rule and when the communication establishment state included in the detection rule is OFF.

According to this configuration, since the communication establishment state that indicates for each communication ID whether a communication frame is or is not permitted to be communicated is stored, even if it is a communication frame that includes the server address or the client address identical to the server address or the client address written in the detection rule, the communication frame communicated improperly while not being permitted to be communicated can be determined to be anomalous.

The detection rule generator may set, to OFF, the communication establishment state included in the detection rule that includes the set of the communication ID and the server address written in the communication establishment frame or the set of the communication ID and the client address written in the communication establishment frame after having waited for a predetermined time when the communication type is the service offer stop or the service subscription stop.

According to this configuration, since it may take a predetermined time until the server finishes receiving the subscription stop or until the client finishes receiving the service offer stop after the frame for the service offer stop or the service subscription stop has been transmitted, changing the communication establishment state in the detection rule after having waited for the predetermined time makes it possible to prevent false detection in a time range in which the server has not received the subscription stop or the client has not received the service offer stop.

The detection rule generator may check the communication type written in the communication establishment frame. The detection rule generator may check whether there is a detection rule that includes the set of the communication ID and the server address written in the communication establishment frame when the communication type is the service offer stop and determine that the communication establishment frame is anomalous when the detection rule does not exist. The detection rule generator may check whether there is a detection rule that includes the set of the communication ID and the client address written in the communication establishment frame when the communication type is the service subscription stop and determine that the communication establishment frame is anomalous when the detection rule does not exist.

According to this configuration, if the service offer stop or the service subscription stop that is supposed to be performed after the service offer or the service subscription has been performed is performed although the service offer or the service subscription has not been performed in the communication establishment phase, this communication can be determined to be illegitimate communication and can thus be determined to be anomalous.

The anomaly detection device may store in advance at least one of a server count per communication ID or a client count per communication ID in the in-vehicle network system. The server count per communication ID may indicate a maximum number of servers to be used for each communication ID, and the client count per communication ID may indicate a maximum number of clients to be used for each communication ID. The detection rule generator may check whether there is a detection rule that includes the set of the communication ID and the server address written in the communication establishment frame. When the detection rule does not exist, the detection rule generator may determine that the communication establishment frame is anomalous when a type count of the server address in a detection rule that includes the communication ID is higher than the server count per communication ID, or add a detection rule that includes the set of the communication ID and the server address written in the communication establishment frame when the type count of the server address in the detection rule that includes the communication ID is equal to or lower than the server count per communication ID. Alternatively, the detection rule generator may check whether there is a detection rule that includes the set of the communication ID and the client address written in the communication establishment frame. When the detection rule does not exist, the detection rule generator may determine that the communication establishment frame is anomalous when a type count of the client address in a detection rule that includes the communication ID is higher than the client count per communication ID, or add a detection rule that includes the set of the communication ID and the client address written in the communication establishment frame when the type of the client address in the detection rule that includes the communication ID is equal to or lower than the client count per communication ID.

According to this configuration, as the maximum number of the servers or the maximum number of the clients, which can be configured more easily than the IP address, to be used for each communication ID is set in advance, the type count of communication establishment frame, or in other words, the type count of the servers or the clients present in the in-vehicle network system increases more than normal and exceeds the maximum number if an illegitimate communication establishment frame is transmitted, and thus this communication establishment frame can be determined to be anomalous.

The anomaly detection device may store a previous detection rule generated when started last time. In response to determining that the communication establishment frame is anomalous when the detection rule generator monitors the communication establishment frame to generate a detection rule, the detection rule generator may refer to a previous detection rule that includes the communication ID written in the communication establishment frame and overwrite content written in the detection rule that includes the communication ID with content written in the previous detection rule.

According to this configuration, if an illegitimate communication establishment frame is transmitted, a previous detection rule is given a priority. Therefore, for example, if there is a possibility that legitimate communication establishment frames are flowing and a proper detection rule is in place before shipment but an illegitimate communication establishment frame is transmitted and the detection rule is modified maliciously after shipment, the proper detection rule held before the shipment can be given a priority, and this makes it possible to use a more proper detection rule.

The anomaly detection device may store in advance a vehicle state in which communication is permitted for each communication ID. The detection rule generator may acquire a current vehicle state in response to receiving the communication establishment frame, and determine that the communication establishment frame is anomalous when the current vehicle state differs from the vehicle state in which communication is permitted as stored in advance for the communication ID written in the communication establishment frame. The anomaly detector may acquire a current vehicle state in response to receiving the communication frame, and detect the communication frame as an anomalous frame when the current vehicle state differs from the vehicle state in which communication is permitted as stored in advance for the communication ID written in the communication frame.

According to this configuration, if a communication establishment frame or a communication frame is transmitted in an improper vehicle state, this communication establishment frame or this communication frame can be determined to be anomalous.

The vehicle state may include at least one of an ignition state, a network connection state, a gearshift state, a drive assist mode state, an automatic driving state, or a person or object detection state.

According to this configuration, an anomalous communication frame can be detected if a camera image processing frame that occurs only when the ignition is ON, a software update frame that occurs only in the network connected state or the gearshift park state, a steering instruction frame that occurs only in the automatic parking mode, or a brake control instruction frame that occurs only in the automatic driving mode and human and object detection state occurs in an improper state.

SOME/IP may be used in the communication phase of the service-oriented communication, and SOME/IP-SD may be used in the communication establishment phase of the service-oriented communication. The communication ID may include ServiceID and MethodID. A service offer, a service subscription, a service search, a service subscription acknowledgment, a service offer stop, and a service subscription stop in a communication type may be, respectively, ServiceOffer, ServiceSubscribe, ServiceFind, ServiceSubscribeAck, StopOffer, and StopSubscribe.

According to this configuration, in SOME/IP, a rule can be generated dynamically in the communication establishment phase, and an anomalous communication frame can be detected in the communication phase.

An anomaly detection method according to one aspect of the present disclosure is an anomaly detection method in an in-vehicle network system performing service-oriented communication via Ethernet (registered trade mark). The anomaly detection method includes a detection rule generating step, an anomaly detecting step, and an anomaly notifying step. In the detection rule generating step, a communication establishment frame flowing over the Ethernet in a communication establishment phase of the service-oriented communication is monitored, and a detection rule including a communication ID written in the communication establishment frame and a server address or a client address written in the communication establishment frame is generated for each communication ID. In the anomaly detecting step, a communication frame flowing over the Ethernet in a communication phase of the service-oriented communication is monitored, and the communication frame is detected as an anomalous frame, by referring to a detection rule that includes a communication ID written in the communication frame, when a server address or a client address written in the communication frame differs from a server address or a client address included in the detection rule. In the anomaly notifying step, a notification of an anomaly is provided in response to detecting the anomalous frame.

This can provide an anomaly detection method that can help improve the safety of automobiles without sacrificing the portability of service-oriented communication.

General or specific aspects of the above may be implemented in the form of a system, a method, an integrated circuit, a computer program, or a computer readable recording medium, such as a CD-ROM, or through any desired combination of a system, a method, an integrated circuit, a computer program, and a recording medium.

Hereinafter, an anomaly detection device according to some embodiments will be described with reference to the drawings. The embodiments described below merely illustrate some specific examples of the present disclosure. Therefore, the numerical values, the constituent elements, the arrangement and the connection modes of the constituent elements, the steps as the elements of a process, the order of the steps, and so on illustrated in the following embodiments are examples and are not intended to limit the present disclosure. Among the constituent elements in the following embodiments, any constituent element that is not described in the independent claims is a constituent element that can be added optionally. Furthermore, the drawings are schematic diagrams and do not necessarily provide the exact depictions.

Embodiment 1

[Overall Configuration Diagram of In-Vehicle Network System 10]

FIG. 1 is an overall configuration diagram of in-vehicle network system 10 according to Embodiment 1 of the present disclosure.

In FIG. 1, in-vehicle network system 10 includes IDS ECU 100, Central ECU 200, Zone ECU 300a, Zone ECU 300b, Zone ECU 300c, Zone ECU 300d, camera ECU 400a, car navigation ECU 400b, steering ECU 400c, and brake ECU 400d.

IDS ECU 100, Central ECU 200, Zone ECU 300a, Zone ECU 300b, Zone ECU 300c, and Zone ECU 300d are connected via Ethernet 13.

Camera ECU 400a and Zone ECU 300a are connected via Ethernet 12. Car navigation ECU 400b and Zone ECU 300b are connected via Ethernet 11. Steering ECU 400c and Zone ECU 300c are connected via CAN (registered trademark) 14. Brake ECU 400d and Zone ECU 300d are connected via CAN-FD 15.

Central ECU 200 is connected to an external network, such as the internet, as well as to Ethernet 13.

IDS ECU 100 is an anomaly detection device having a function of providing information on an anomalous frame to a driver or the like by monitoring communication that flows over Ethernet 13 and that is in compliant with the service-oriented communication protocol to detect an anomalous frame, by providing information on the anomalous frame to a server on the internet via Central ECU 200, and by displaying the anomaly on car navigation ECU 400b via Zone ECU 300b. An anomaly detection method will be described later.

Central ECU 200 communicates with Zone ECUs 300a, 300b, 300c, and 300d and IDS ECU 100 via Ethernet 13 in accordance with the service-oriented communication protocol. Thus, Central ECU 200 controls Zone ECUs 300a, 300b, 300c, and 300d and controls in-vehicle network system 10 as a whole.

Moreover, Central ECU 200 includes a switch function and has a function of transferring, to IDS ECU 100, a frame transmitted between Central ECU 200 and Zone ECUs 300a, 300b, 300c, and 300d as well as a frame communicated between Zone ECUs 300a, 300b, 300c, and 300d. Furthermore, Central ECU 200 has a function of receiving information on an anomalous frame from IDS ECU 100 and providing the information on the anomalous frame to a server on the internet via an external network.

Zone ECU 300a communicates with Central ECU 200, IDS ECU 100, and Zone ECUs 300b, 300c, and 300d via Ethernet 13 and communicates with camera ECU 400a via Ethernet 12 to control ON/OFF of a camera image.

Zone ECU 300b communicates with Central ECU 200, IDS ECU 100, and Zone ECUs 300a, 300c, and 300d via Ethernet 13 and communicates with car navigation ECU 400b via Ethernet 11 to control the display of the car navigation system.

Zone ECU 300c communicates with Central ECU 200, IDS ECU 100, and Zone ECUs 300a, 300b, and 300d via Ethernet 13 and communicates with steering ECU 400c via CAN 14 to control the steering of the steering wheel.

Zone ECU 300d communicates with Central ECU 200, IDS ECU 100, and Zone ECUs 300a, 300b, and 300c via Ethernet 13 and communicates with brake ECU 400d via CAN-FD 15 to control the brake.

Camera ECU 400a controls an image to be captured by a camera provided in the vehicle.

Car navigation ECU 400b controls the display of the car navigation system provided in the vehicle.

Steering ECU 400c controls the steering of the steering wheel provided in the vehicle.

Brake ECU 400d controls the brake provided in the vehicle.

[Configuration Diagram of IDS ECU 100]

Figure 2:
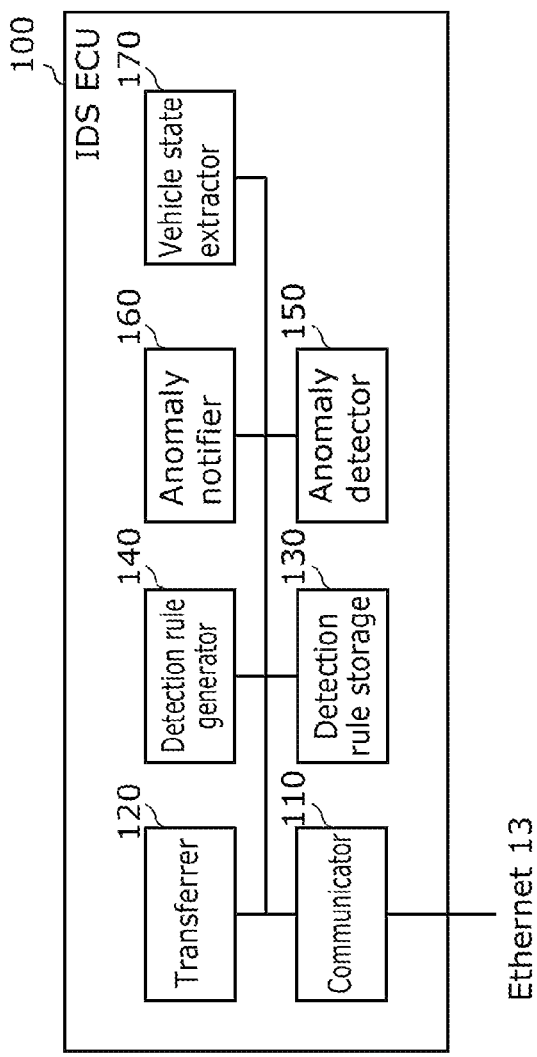
FIG. 2 is a configuration diagram of an IDS ECU according to Embodiment 1 of the present disclosure.

FIG. 2 is a configuration diagram of IDS ECU 100 according to Embodiment 1 of the present disclosure. As illustrated in FIG. 2, IDS ECU 100 includes, for example, communicator 110, transferrer 120, detection rule storage 130, detection rule generator 140, anomaly detector 150, anomaly notifier 160, and vehicle state extractor 170.

Communicator 110 is connected to Ethernet 13. Communicator 110 has a function of receiving a frame that flows over Ethernet 13 and that is compliant with the service-oriented communication protocol and transmitting the received frame to transferrer 120. The service-oriented communication protocol is, for example, SOME/IP. SOME/IP is used in a communication phase of the service-oriented communication, and SOME/IP-SD is used in a communication establishment phase of the service-oriented communication. The details of the data format of SOME/IP will be described later.

Transferrer 120 receives a frame that is compliant with the service-oriented communication protocol from communicator 110. If the received frame is a communication frame in the communication phase of SOME/IP, transferrer 120 transfers the received frame to anomaly detector 150. Meanwhile, if the received frame is a communication establishment frame in the communication establishment phase of SOME/IP, transferrer 120 transfers the received frame to detection rule generator 140. Moreover, if the received frame is a communication frame related to the vehicle state, transferrer 120 transfers the received frame to vehicle state extractor 170. The vehicle state includes, for example, at least one of an ignition state, a network connection state, a gearshift state, a drive assist mode state, an automatic driving state, or a person or object detection state.

In this example, a communication establishment frame is a frame that includes a SOME/IP-SD header, and a communication frame is a frame that includes only a SOME/IP header. A communication frame related to the vehicle state is a frame that stores the network connection state, the vehicle speed, the gearshift state, or the ignition state or a frame that stores the driving state, such as an automatic driving mode or an automatic parking mode.

Detection rule storage 130 receives a detection rule from detection rule generator 140 and stores the received detection rule as a current detection rule. Moreover, detection rule storage 130 stores a previous detection rule. The previous detection rule is a detection rule that detection rule generator 140 has generated when started last time. Furthermore, detection rule storage 130 has an advance setting detection rule stored therein in advance. The advance setting detection rule includes at least one (e.g., both, in this example) of a server count per communication ID or a client count per communication ID as well as the vehicle state and so on in which communication is permitted for each communication ID. The server count per communication ID indicates the maximum number of servers to be used per communication ID. The client count per communication ID indicates the maximum number of clients to be used per communication ID. The details of the advance setting detection rule and the detection rule will be described later.

Detection rule generator 140 monitors the communication establishment frames that flow over Ethernet 13 in the communication establishment phase of the service-oriented communication and generates, for each communication ID, a detection rule that includes the communication ID and the server address or the client address written in a corresponding communication establishment frame. Specifically, detection rule generator 140 receives a communication establishment frame from transferrer 120, generates a detection rule for the communication ID written in the header information of the received communication establishment frame, and stores the generated detection rule into detection rule storage 130. Moreover, detection rule generator 140 acquires the vehicle state from vehicle state extractor 170. Furthermore, detection rule generator 140 transmits, to anomaly notifier 160, a communication establishment frame that detection rule generator 140 has determined to be anomalous when generating the detection rule therefor. While the method of generating a detection rule will be described later, detection rule generator 140 may have the following functions.

Detection rule generator 140 generates, for each of one or more communication IDs, a plurality of detection rules that each include an identical communication ID and different server addresses or different client addresses.

Moreover, detection rule generator 140 checks a communication type written in a communication establishment frame. If the communication type is a service offer, a service subscription acknowledgment, a service search, or a service subscription, detection rule generator 140 sets, to ON, the communication establishment state included in the detection rule that includes the set of the communication ID and the server address written in the communication establishment frame or the set of the communication ID and the client address written in the communication establishment frame. Meanwhile, if the communication type is a service offer stop or a service subscription stop, detection rule generator 140 sets, to OFF, the communication establishment state included in the detection rule that includes the set of the communication ID and the server address written in the communication establishment frame or the set of the communication ID and the client address written in the communication establishment frame. Specifically, if the communication type is the service offer stop or the service subscription stop, detection rule generator 140 sets, to OFF, the communication establishment state included in the detection rule that includes the set of the communication ID and the server address written in the communication establishment frame or the set of the communication ID and the client address written in the communication establishment frame after detection rule generator 140 has waited for a predetermined time.

Moreover, detection rule generator 140 checks the communication type written in a communication establishment frame. If the communication type is the service offer stop, detection rule generator 140 checks whether there is a detection rule that includes the set of the communication ID and the server address written in the communication establishment frame. If such a detection rule does not exist, detection rule generator 140 determines that this communication establishment frame is anomalous. Meanwhile, if the communication type is the service subscription stop, detection rule generator 140 checks whether there is a detection rule that includes the set of the communication ID and the client address written in the communication establishment frame. If such a detection rule does not exist, detection rule generator 140 determines that this communication establishment frame is anomalous.

Moreover, detection rule generator 140 checks whether there is a detection rule that includes the set of the communication ID and the server address written in a communication establishment frame. If such a detection rule does not exist, detection rule generator 140 determines that this communication establishment frame is anomalous if the type count of the server address in a detection rule that includes the aforementioned communication ID is higher than the server count per communication ID, or detection rule generator 140 adds a detection rule that includes the set of the communication ID and the server address written in the communication establishment frame if the type count of the server address in the detection rule that includes the aforementioned communication ID is equal to or lower than the server count per communication ID. Moreover, detection rule generator 140 checks whether there is a detection rule that includes the set of the communication ID and the client address written in a communication establishment frame. If such a detection rule does not exist, detection rule generator 140 determines that this communication establishment frame is anomalous if the type count of the client address in a detection rule that includes the aforementioned communication ID is higher than the client count per communication ID, or detection rule generator 140 adds a detection rule that includes the set of the communication ID and the client address written in the communication establishment frame if the type count of the client address in a detection rule that includes the aforementioned communication ID is equal to or lower than the client count per communication ID.

Moreover, if detection rule generator 140 determines that a given communication establishment frame is anomalous when monitoring communication establishment frames and generating a detection rule, detection rule generator 140 refers to a previous detection rule that includes the communication ID written in the aforementioned communication establishment frame and overwrites the content written in the detection rule that includes the aforementioned communication ID with the content written in the previous detection rule.

Moreover, detection rule generator 140 acquires the current vehicle state in response to receiving a communication establishment frame. Detection rule generator 140 determines that this communication establishment frame is anomalous if the vehicle state in which this communication is permitted as stored in advance differs from the current vehicle state for the communication ID written in the communication establishment frame.

Anomaly detector 150 receives a communication frame from transferrer 120, acquires a set of the communication ID, the server address, and the client address written in the header information of the received communication frame, acquires the vehicle state from vehicle state extractor 170, refers to the current detection rule stored in detection rule storage 130, and determines whether the received communication frame is an anomalous frame based on the detection rule. While the method of detecting an anomalous frame will be described later, anomaly detector 150 may have the following functions.

Anomaly detector 150 monitors communication frames that flow over Ethernet 13 in the communication phase of the service-oriented communication. Anomaly detector 150 refers to a detection rule that includes the communication ID written in a given communication frame. If the server address or the client address written in this communication frame differs from the server address or the client address included in the detection rule, anomaly detector 150 detects this communication frame as an anomalous frame.

Moreover, anomaly detector 150 refers to a plurality of detection rules that include the communication ID written in a communication frame. If the server address or the client address written in this communication frame differs from any of the server addresses or any of the client addresses included in the plurality of detection rules, anomaly detector 150 detects this communication frame as an anomalous frame.

Moreover, anomaly detector 150 refers to a detection rule that includes the communication ID written in a communication frame. If the server address or the client address written in this communication frame matches the server address or the client address included in the detection rule and if the communication establishment state included in this detection rule is OFF, anomaly detector 150 detects this communication frame as an anomalous frame.

Moreover, anomaly detector 150 acquires the current vehicle state in response to receiving a communication establishment frame. Anomaly detector 150 detects this communication frame as an anomalous frame if the current vehicle state differs from the vehicle state in which communication is permitted as stored in advance for the communication ID written in the communication frame.

Anomaly notifier 160 receives an anomalous communication establishment frame from detection rule generator 140, receives an anomalous communication frame from anomaly detector 150, stores information on an anomalous frame (the anomalous communication establishment frame or the anomalous communication frame) into a frame addressed to Central ECU 200, and transmits this information to communicator 110.

Vehicle state extractor 170 receives a communication frame related to the vehicle state from transferrer 120, extracts the vehicle state, and transmits the extracted vehicle state to detection rule generator 140 and anomaly detector 150.

[Header Format in In-Vehicle Network System 10]

Figure 3:
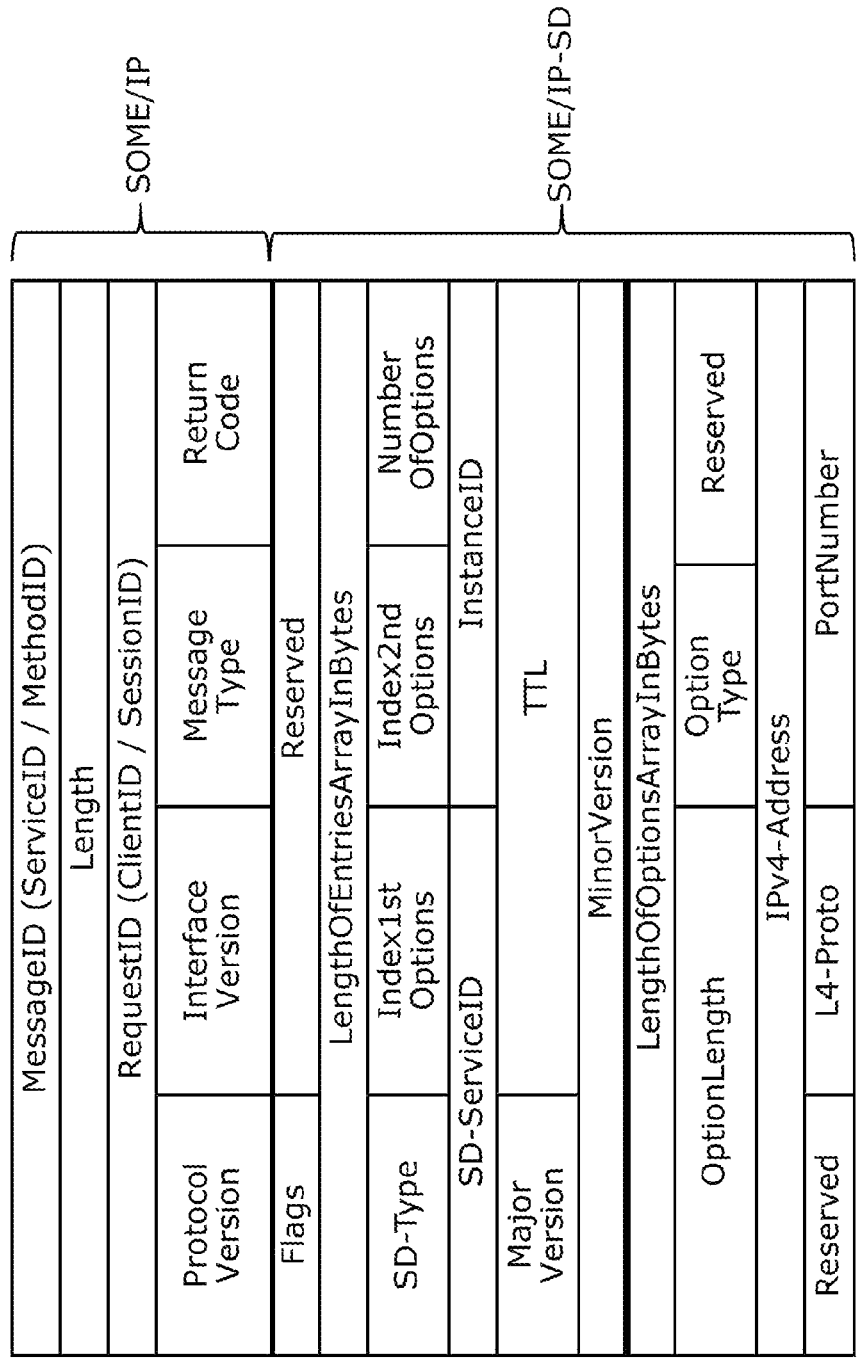
FIG. 3 illustrates an example of a header format in Ethernet in the in-vehicle network system according to Embodiment 1 of the present disclosure.

FIG. 3 illustrates a header format in Ethernet 13 of in-vehicle network system 10 according to Embodiment 1 of the present disclosure. In this example, the header format is a header format of SOME/IP, which is service-oriented communication.

Only a SOME/IP header is stored in a communication frame in the communication phase of SOME/IP, and a SOME/IP header and a SOME/IP-SD header are stored in a communication establishment frame in the communication establishment phase of SOME/IP.

The SOME/IP header includes MessageID, Length, RequestID, ProtocolVersion, InterfaceVersion, MessageType, and ReturnCode.

MessageID includes ServiceID and MethodID. MessageID is unique in in-vehicle network system 10. ServiceID indicates a number for identifying an application of a service offered by a server, and MethodID indicates a number for a method of an application of a service offered by a server.

Length indicates the length from RequestID to the end of the SOME/IP header.

RequestID includes ClientID and SessionID. ClientID indicates a number for identifying an application of a client, and SessionID indicates a number for identifying communication between an application of a server and an application of a client.

ProtocolVersion indicates version information of the SOME/IP protocol. InterfaceVersion indicates the version of the interface of the SOME/IP protocol. MessageType indicates the communication type of a communication frame of SOME/IP. ReturnCode indicates a return value, such as an error code.

MessageType indicates specifically a number for identifying Request, RequestNoReturn, Response, Error, TPRequest, TPNotification, TPResponse, or TPError.

In this example, MessageID is also referred to below as a communication ID. In other words, a communication ID includes ServiceID and MethodID. The content of a communication frame is determined in accordance with the communication ID. For example, checking the communication ID makes it possible to determine what type of information is stored in the communication frame, and examples of the communication frame include a communication frame that offers a service requesting a camera image, a communication frame that requests a software update, a communication frame that commands steering wheel control, a communication frame that commands brake control, a communication frame that provides a vehicle state, or a communication frame that requests a gearshift change.

A SOME/IP-SD header includes Flags, Reserved, LengthOfEntriesArrayInBytes, SD-Type, Index1stOptions, Index2ndOptions, NumberOfOptions, SD-ServiceID, InstanceID, MajorVersion, TTL, and MinorVersion.

Flags indicates flag information. Reserved indicates a reservation number. LengthOfEntriesArrayInBytes indicates the length to the end of the SOME/IP-SD header excluding options. SD-Type indicates the communication type of a communication establishment frame of SOME/IP. Index1stOptions indicates the presence or the absence of a first option header. Index2ndOptions indicates the presence or the absence of a second option header. NumberOfOptions indicates the number of option headers. SD-ServiceID indicates the identification number of a communication establishment frame of SOME/IP-SD. InstanceID indicates a number for identifying an ECU. MajorVersion indicates the major version of the communication establishment phase. TTL indicates TTL. MinorVersion indicates the minor version of the communication establishment phase.

Moreover, the SOME/IP-SD header includes, as an option, LengthOfOptionsArrayInBytes, OptionLength, OptionType, Reserved, IPv4-Address, L4-Proto, and PortNumber. The option is used when information on the IP address is to be shared.

LengthOfOptionsArrayInBytes indicates the data length of the entire option header. OptionLength indicates the length of a first option header. OptionType indicates the communication type of the option. Reserved indicates a reservation number. IPv4-Address indicates the address information of IPv4. L4-Proto indicates the type of a communication protocol in IPv4, such as UDP or TCP. PortNumber indicates the port number.

SD-Type is also referred to as an SD communication type. Examples of the SD communication type include a service offer, a service subscription, a service search, a service subscription acknowledgment, a service offer stop, and a service subscription stop. The service offer, the service subscription, the service search, the service subscription acknowledgment, the service offer stop, and the service subscription stop in the communication type are, respectively, ServiceOffer, ServiceSubscribe, ServiceFind, ServiceSubscribeAck, StopOffer, and StopSubscribe. Specifically, the SD communication type includes a number for identifying ServiceOffer, ServiceStopOffer, Subscribe, ServiceSubscribeAck, StopSubscribe, or ServiceFind.

ServiceOffer is used to notify a client that the service offered by the server is available. ServiceStopOffer is used to notify a client that the service offered by the server is not available. Subscribe is used to notify a server that a client is to start subscribing to a service. StopSubscribe is used to notify a server that a client is to stop subscribing to the service. ServiceFind is used to find a server that has a service desired by a client.

In SOME/IP, before the SOME/IP communication is carried out in the communication phase, a server broadcasts a frame that stores the SOME/IP-SD header in the communication establishment phase to find a client hoping to use a service corresponding to a predetermined ServiceID. In addition, a client searches for a server that offers a service corresponding to the desired ServiceID and acquires information, such as the IP address and the port number, of the communicating party. Thereafter, the service-oriented communication is carried out based on ServiceID and MessageType written in the SOME/IP header.

However, the measures against data spoofing are not sufficient in SOME/IP alone, and there are some problems in that an illegitimate client can establish communication with a server by observing the broadcast communication of SOME/IP-SD or an illegitimate server can establish communication with a client by observing the broadcast communication of SOME/IP-SD.

Referring to ServiceOffer or ServiceSubscribeAck in SOME/IP-SD that is broadcast from a server allows an attacker to acquire the IP address of the server that offers the service corresponding to the specific service ID, the protocol, the port number, and the identification number of the ECU. In addition, referring to the IPv4 packet allows an attacker to acquire the MAC address.

Moreover, referring to StopServiceOffer in SOME/IP-SD that is broadcast from a server allows an attacker to find out that the service is not available.

Meanwhile, referring to ServiceFind or ServiceSubscribe in SOME/IP-SD that is broadcast from a client allows an attacker to acquire the IP address of the client that offers the service corresponding to the specific service ID, the protocol, the port number, and the identification number of the ECU. In addition, referring to the IPv4 packet allows an attacker to acquire the MAC address.

Moreover, referring to StopSubscribe in SOME/IP-SD that is broadcast from a client allows an attacker to find out that the client no longer receives the service.

[Advance Setting Detection Rule]

FIG. 4 illustrates an example of an advance setting detection rule stored in detection rule storage 130 according to Embodiment 1 of the present disclosure. As illustrated in FIG. 4, the advance setting detection rule includes, for example, the communication ID including the service ID and the method ID, the server count, the client count, the vehicle state, and the service content.

The service ID corresponds to ServiceID in the SOME/IP header format in Ethernet 13 illustrated in FIG. 3, and the method ID corresponds to MethodID in the SOME/IP header format in Ethernet 13 illustrated in FIG. 3.

The server count indicates the total number (the maximum number) of servers that offer the service corresponding to the communication ID. In other words, the server count indicates the server count per communication ID. The client count indicates the total number (the maximum number) of clients that use the service corresponding to the communication ID. In other words, the client count indicates the client count per communication ID.

The vehicle state indicates the condition of the vehicle state in which the service corresponding to the communication ID can be offered or used. Specifically, the vehicle state includes, for example but not limited to, the "ignition ON state" indicating that the ignition of the vehicle is ON, the "network ON state" indicating that the network connection in the vehicle is ON, the "parking ON state" indicating that the gearshift of the vehicle is in park, the "stop state" indicating that the speed of the vehicle is 0 km/h, the "autocruise mode" indicating that the traveling mode of the vehicle is the autocruise mode, the "auto-parking mode" indicating that the traveling mode of the vehicle is the auto-parking mode, or the "human detection" indicating that a camera or a sensor of the vehicle is detecting a human.

A plurality of vehicle states can be set, and "or" and "and" mean, respectively, an OR condition and an AND condition.

The service content indicates the overview of the service corresponding to the communication ID.

In FIG. 4, for example, the advance setting detection rule indicated in the second row states that the service ID is "0001", the method ID is "0002", the communication ID is "00010002", the server count is "1", the client count is "5", the vehicle state is "network connection ON state and parking state and stop state", and the service content is "software update request".

In addition, in FIG. 4, for example, the advance setting detection rule indicated in the sixth row states that the service ID is "0009", the method ID is "0010", the communication ID is "00090010", the server count is "1", the client count is "1", the vehicle state is "-", and the service content is "gearshift change request". In this example, "-" means that the vehicle state can be any state.

Detection rule generator 140 can acquire the total number of the servers that offer the service corresponding to the communication ID, the total number of the clients that use the service corresponding to the communication ID, and the condition(s) of the vehicle state in which the service corresponding to the communication ID can be communicated by referring to the advance setting detection rule stored in detection rule storage 130.

Moreover, when detection rule generator 140 has received a frame that includes a specific communication ID, detection rule generator 140 can determine that an illegitimate server is connected and there is an anomaly if the total number of the observed servers (the server addresses) is greater than the total number of the servers that offer the service corresponding to the specific communication ID, that is, if the total number of the observed servers (the server addresses) is greater than the server count per communication ID. In addition, detection rule generator 140 can determine that an illegitimate client is connected and there is an anomaly if the total number of the observed clients (the client addresses) is greater than the total number of the clients that use the service corresponding to the communication ID, that is, if the total number of the observed clients (the client addresses) is greater than the client count per communication ID.

Moreover, when detection rule generator 140 has received a frame that includes a specific communication ID, detection rule generator 140 can determine that the service is being offered in an improper vehicle state and there is an anomaly if the current vehicle state fails to match the vehicle state indicated in the advance setting detection rule.

[Dynamic Setting Detection Rule]

FIG. 5 illustrates an example of a dynamic setting detection rule that is generated by detection rule generator 140, stored in detection rule storage 130, and referred to by anomaly detector 150 according to Embodiment 1 of the present disclosure. As illustrated in FIG. 5, the dynamic setting detection rule is, for example, a detection rule that includes the communication ID including the service ID and the method ID, the server address, the client address, and the communication establishment state.

The service ID corresponds to ServiceID in the SOME/IP header format in Ethernet 13 illustrated in FIG. 3, and the method ID corresponds to MethodID in the SOME/IP header format in Ethernet 13 illustrated in FIG. 3. The server address indicates the IP address of the server that offers the service corresponding to the communication ID. The client address indicates the IP address of the client that uses the service corresponding to the communication ID. The communication establishment state indicates whether the service corresponding to the communication ID is currently active. The service is permitted if the communication establishment state is "ON", or the service is not permitted if the communication establishment state is "OFF". In other words, communication establishment state is ON if the server corresponding to the server address included in the detection rule or the client corresponding to the client address included in the detection rule is in a state of carrying out the communication concerning the service corresponding to the communication ID included in the detection rule. Meanwhile, the communication establishment state is OFF if the server corresponding to the server address included in the detection rule or the client corresponding to the client address included in the detection rule is not in a state of carrying out the communication concerning the service corresponding to the communication ID included in the detection rule.

In FIG. 5, for example, the dynamic setting detection rule indicated in the first row states that the service ID is "0001", the method ID is "0001", the communication ID is "00010001", the server address is "X", the client address is "A", and the communication establishment state is "ON".

Moreover, in FIG. 5, for example, the dynamic setting detection rule indicated in the ninth row states that the service ID is "0002", the method ID is "0003", the communication ID is "00020003", the server address is "Y", the client address is "B", and the communication establishment state is "OFF".

For example, detection rule generator 140 generates detection rules that include the identical communication ID "00010001" and different client addresses "A" and "B" for the communication ID "00010001". Detection rule generator 140 also generates detection rules that include the identical communication ID "00010002" and different client addresses "A", "B", "C", "D", and "E" for the communication ID "00010002". Detection rule generator 140 also generates detection rules that include the identical communication ID "00020003", different server addresses "X" and "Y", and different client addresses "A" and "B" for the communication ID "00020003". Detection rule generator 140 also generates detection rules that include the identical communication ID "00030004" and different server addresses "Z" and "X" for the communication ID "00030004".

Meanwhile, detection rule storage 130 deletes the entire dynamic setting detection rule when the power of in-vehicle network system 10 is turned ON and stores the dynamic setting detection rule as an old dynamic setting detection rule (a previous detection rule) when the power of in-vehicle network system 10 is turned OFF.

Detection rule generator 140 can generate the items under the communication ID by referring to ServiceID and MethodID included in the SOME/IP header in Ethernet 13 illustrated in FIG. 3. Detection rule generator 140 can also generate the items under the server address so as to correspond to the generated items under the communication ID by referring to the IP address for each communication ID included in the SOME/IP-SD option header transmitted from the server. Detection rule generator 140 can also generate the items under the client address so as to correspond to the generated items under the communication ID by referring to the IP address for each communication ID included in the SOME/IP-SD option header transmitted from the client. Detection rule generator 140 can also generate the items under the communication establishment state so as to correspond to the generated items under the communication ID by referring to SD-Type for each communication ID included in the SOME/IP-SD option header transmitted from the server.

Specifically, detection rule generator 140 can set to "ON" the communication establishment state in the dynamic setting detection rule that includes the corresponding communication ID and the corresponding server address if SD-Type is ServiceOffer or ServiceSubscribeAck. Detection rule generator 140 can also set to "OFF" the communication establishment state in the dynamic setting detection rule that includes the corresponding communication ID and the corresponding server address if SD-Type is StopServiceOffer. Detection rule generator 140 can also set to "ON" the communication establishment state in the dynamic setting detection rule that includes the corresponding communication ID and the corresponding server address if SD-Type is ServiceFind or ServiceSubscribe. Detection rule generator 140 can also set to "OFF" the communication establishment state in the dynamic setting detection rule that includes the corresponding communication ID and the corresponding server address if SD-Type is StopSubscribe.

Meanwhile, anomaly detector 150 can check, by referring to the dynamic setting detection rule, whether the communication ID, the server address, and the client address included in the frame match the communication ID, the server address, and the client address in the dynamic setting detection rule. If the communication IDs, the server addresses, and the client addresses fail to match, anomaly detector 150 can determine that this frame has not undergone the legitimate communication establishment phase and is an anomalous frame.

Moreover, anomaly detector 150 can check whether a frame that includes a specific communication ID, a specific server address, and a specific client address is currently effective (i.e., whether the communication establishment state is ON). If the frame is not effective, anomaly detector 150 can determine that this frame has been transmitted in an illegitimate communication establishment state and is an anomalous frame.

[Processing Sequence]

Figure 6:
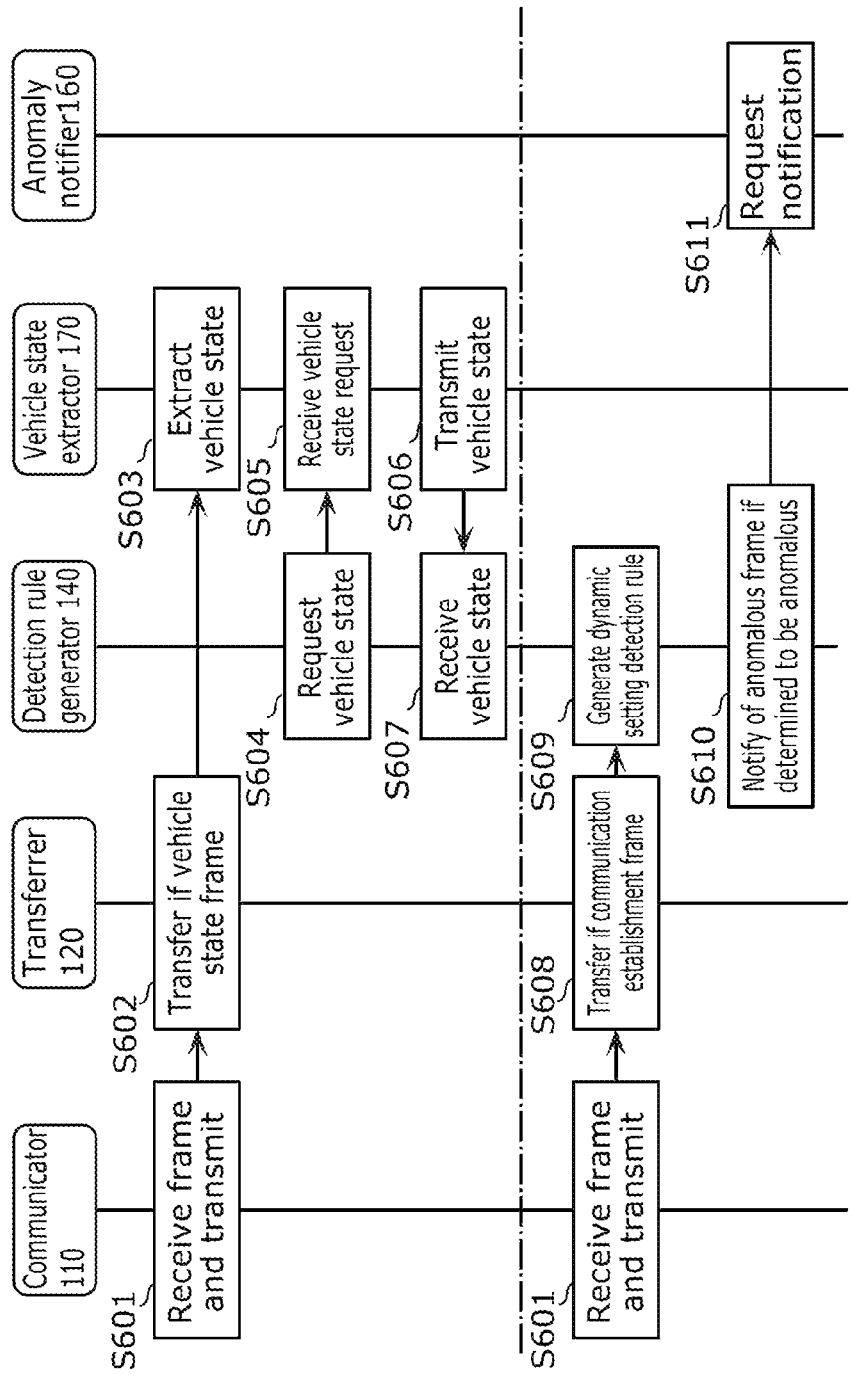
FIG. 6 illustrates a sequence of a detection rule generating process according to Embodiment 1 of the present disclosure.
Figure 7:
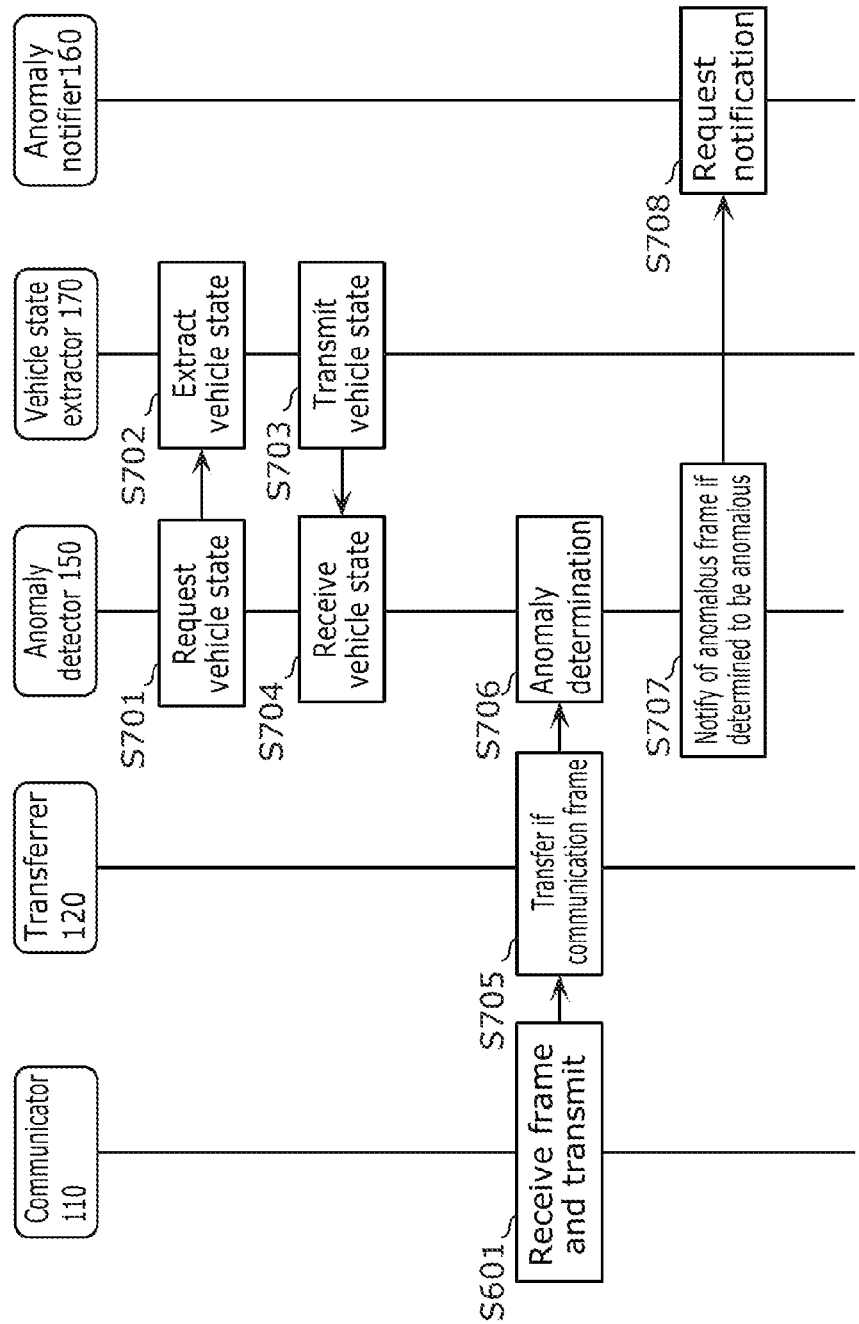
FIG. 7 illustrates a sequence of an anomaly detecting process according to Embodiment 1 of the present disclosure.

FIG. 6 illustrates a sequence of a detection rule generating process according to Embodiment 1 of the present disclosure. FIG. 7 illustrates a sequence of an anomaly detecting process according to Embodiment 1 of the present disclosure. Specifically, FIGS. 6 and 7 illustrate a processing sequence through which IDS ECU 100 acquires a vehicle network log, generates a dynamic setting detection rule, detects an anomalous frame by referring to the dynamic setting detection rule and an advance setting detection rule, and provides a notification concerning the anomalous frame according to Embodiment 1 of the present disclosure. In FIG. 6, the processing sequence is illustrated separately for a case where a received frame is a vehicle state frame and for a case where a received frame is a communication establishment frame. Specifically, the processing sequence to be followed in a case where a received frame is a vehicle state frame is illustrated above the dashed-dotted line indicated in FIG. 6, and the processing sequence to be followed in a case where a received frame is a communication establishment frame is illustrated below the dashed-dotted line indicated in FIG. 6. FIG. 7 illustrates the processing sequence to be followed in a case where a received frame is a communication frame.

First, FIG. 6 will be described.

(S601) Communicator 110 of IDS ECU 100 receives a frame that flows over Ethernet 13 and that is compliant with the service-oriented communication protocol. Communicator 110 then transmits the received frame to transferrer 120.

(S602) Transferrer 120 receives the frame from communicator 110. If the frame is a vehicle state frame in which the SOME/IP-SD header includes the communication ID that provides the vehicle state, transferrer 120 transmits the vehicle state frame to vehicle state extractor 170.

(S603) Vehicle state extractor 170 receives the vehicle state frame from transferrer 120 and extracts the vehicle state included in the vehicle state frame.

(S604) Detection rule generator 140 sends a request for the vehicle state to vehicle state extractor 170.

(S605) Vehicle state extractor 170 receives the request for the vehicle state from detection rule generator 140.

(S606) Vehicle state extractor 170 transmits the vehicle state to detection rule generator 140.

(S607) Detection rule generator 140 receives the vehicle state from vehicle state extractor 170.

(S608) Meanwhile, transferrer 120 receives the frame from communicator 110. If the frame is a communication establishment frame that includes the SOME/IP-SD header, transferrer 120 transmits the communication establishment frame to detection rule generator 140.

(S609) Detection rule generator 140 receives the communication establishment frame from transferrer 120. Then, detection rule generator 140 generates a dynamic setting detection rule and stores the generated dynamic setting detection rule into detection rule storage 130. The method of generating the dynamic setting detection rule will be described later.

(S610) Detection rule generator 140 transmits, as an anomalous frame, the communication establishment frame that detection rule generator 140 has determined to be anomalous when generating the dynamic setting detection rule to anomaly notifier 160. The method of determining whether a communication establishment frame is anomalous when generating a dynamic setting detection rule will be described later.

(S611) In response to receiving the anomalous frame in S610, anomaly notifier 160 transmits, to Central ECU 200, a frame requesting that the driver or an emergency report destination, another vehicle, another system, or another IntrusionPrevensionSystem (IPS) be notified of the anomaly in the vehicle.

Now, FIG. 7 will be described.

(S701) Anomaly detector 150 sends a request for the vehicle state to vehicle state extractor 170.

(S702) Vehicle state extractor 170 receives the request for the vehicle state from anomaly detector 150 and extracts the vehicle state.

(S703) Vehicle state extractor 170 transmits the vehicle state to anomaly detector 150.

(S704) Anomaly detector 150 receives the vehicle state from vehicle state extractor 170.

(S705) Transferrer 120 receives the frame from communicator 110. If the frame is a communication frame that does not include the SOME/IP-SD header, transferrer 120 transmits the communication frame to anomaly detector 150.

(S706) In response to receiving the frame from transferrer 120, anomaly detector 150 determines whether the received communication frame is anomalous by referring to the advance setting detection rule and the dynamic setting detection rule stored in detection rule storage 130. The method of determining an anomaly will be described later.

(S707) If anomaly detector 150 determines that the communication frame is anomalous, anomaly detector 150 transmits the anomalous frame to anomaly notifier 160.

(S708) In response to receiving the anomalous frame from anomaly detector 150, anomaly notifier 160 transmits, to Central ECU 200, a frame requesting that the driver or police be notified that an anomaly has occurred in the vehicle.

[Flowchart of Detection Rule Generating Process]

Figure 8:
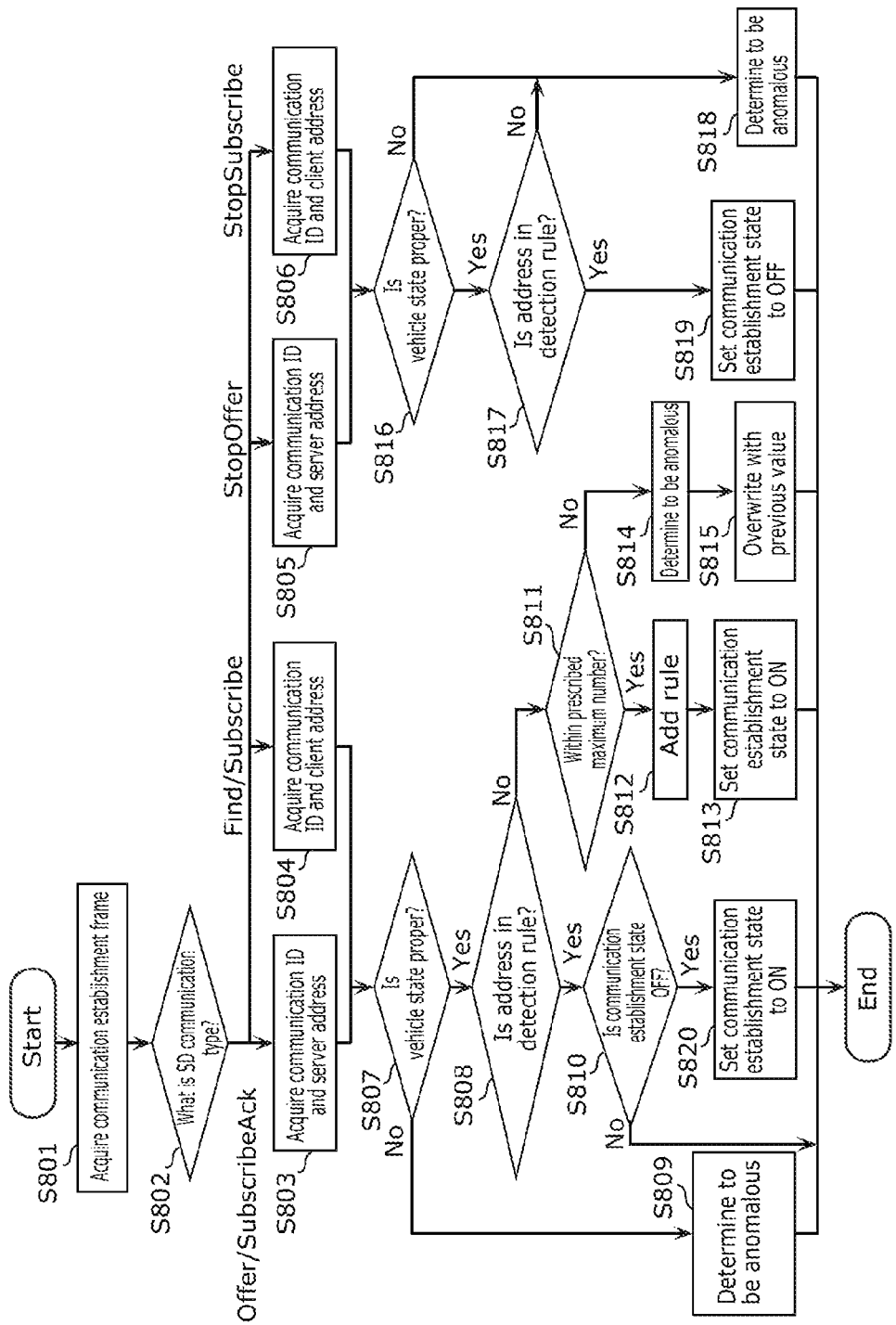
FIG. 8 is a flowchart of the detection rule generating process according to Embodiment 1 of the present disclosure.

FIG. 8 is a flowchart of the detection rule generating process performed by detection rule generator 140 according to Embodiment 1 of the present disclosure.

(S801) Detection rule generator 140 receives a communication establishment frame that includes a SOME/IP-SD header from transferrer 120 and performs S802.

(S802) Detection rule generator 140 checks the SD communication type included in the SOME/IP-SD header of the received communication establishment frame. Detection rule generator 140 performs S803 if the SD communication type is ServiceOffer or ServiceSubscribeAck. Detection rule generator 140 performs S804 if the SD communication type is ServiceFind or ServiceSubscribe. Detection rule generator 140 performs S805 if the SD communication type is StopOffer. Detection rule generator 140 performs S806 if the SD communication type is StopServiceSubscribe. Although it is not illustrated in FIG. 8, detection rule generator 140 terminates the process if the SD communication type is other than those listed above.

(S803) Detection rule generator 140 acquires the communication ID by referring to SD-ServiceID included in the SOME/IP-SD header of the received frame, acquires the server address by referring to IPv4Address included in the SOME/IP-SD header, and performs S807. In this example, since the SD communication type is ServiceOffer or ServiceSubscribeAck, the received frame is a frame transmitted from a server. Therefore, the IP address of the server is written in IPv4Address.

(S804) Detection rule generator 140 acquires the communication ID by referring to SD-ServiceID included in the SOME/IP-SD header of the received frame, acquires the client address by referring to IPv4Address included in the SOME/IP-SD header, and performs S807. In this example, since the SD communication type is ServiceFind or ServiceSubscribe, the received frame is a frame transmitted from a client. Therefore, the IP address of the client is written in IPv4Address.

(S805) Detection rule generator 140 acquires the communication ID by referring to SD-ServiceID included in the SOME/IP-SD header of the received frame, acquires the server address by referring to IPv4Address included in the SOME/IP-SD header, and performs S816. In this example, since the SD communication type is StopOffer, the received frame is a frame transmitted from a server. Therefore, the IP address of the server is written in IPv4Address.

(S804) Detection rule generator 140 acquires the communication ID by referring to SD-ServiceID included in the SOME/IP-SD header of the received frame, acquires the client address by referring to IPv4Address included in the SOME/IP-SD header, and performs S816. In this example, since the SD communication type is StopServiceSubscribe, the received frame is a frame transmitted from a client. Therefore, the IP address of the client is written in IPv4Address.

(S807) Detection rule generator 140 refers to a row, within the advance setting detection rule stored in detection rule storage 130, that has a communication ID identical to the communication ID acquired at S803 or S804. Detection rule generator 140 performs S809 if the current vehicle state acquired from vehicle state extractor 170 fails to match the vehicle state in the aforementioned row (No at S807) or performs S808 if the stated current vehicle state matches the vehicle state in the stated row (Yes at S807).

(S808) Detection rule generator 140 refers to a row, within the dynamic setting detection rule stored in detection rule storage 130, that has a communication ID identical to the communication ID acquired at S803 or S804. Detection rule generator 140 performs S810 if there is a set of a communication ID and a server address or a set of a communication ID and a client address that is identical to, respectively, the set of the communication ID and the server address acquired at S803 or the set of the communication ID and the client address acquired at S804 (Yes at S808) or performs S811 if there is no set of a communication ID and a server address or no set of a communication ID and a client address that is identical to, respectively, the set of the communication ID and the server address acquired at S803 or the set of the communication ID and the client address acquired at S804 (No at S808).

(S809) Detection rule generator 140 determines that the received communication establishment frame is an anomalous frame on the basis that the received communication establishment frame has been transmitted in an improper vehicle state. Then, detection rule generator 140 transmits the anomalous frame to anomaly notifier 160 and terminates the process.

(S810) In a case where detection rule generator 140 has acquired the set of the communication ID and the server address at S803, detection rule generator 140 refers to a row, within the dynamic setting detection rule stored in detection rule storage 130, that has a set of a communication ID and a server address that is identical to the acquired set of the communication ID and the server address. In a case where detection rule generator 140 has acquired the set of the communication ID and the client address at S804, detection rule generator 140 refers to a row that has a set of a communication ID and a client address that is identical to the acquired set of the communication ID and the client address. Then, detection rule generator 140 performs S820 if the communication establishment state in the stated corresponding row is OFF (Yes at S810) or terminates the process if the communication establishment state in the stated corresponding row is ON (No at S810).

(S811) In a case where detection rule generator 140 has acquired the set of the communication ID and the server address at S803, detection rule generator 140 acquires a server count (a server count per communication ID) by referring to a row having a communication ID identical to the acquired communication ID within the advance setting detection rule stored in detection rule storage 130. Then, detection rule generator 140 acquires a type count of the server address by referring to the dynamic setting detection rule for the identical communication ID within the dynamic setting detection rule. Detection rule generator 140 performs S812 if the type count of the server address is lower than or equal to the server count (Yes at S811) or performs S814 if the type count of the server address is higher than the server count (No at S811).

Meanwhile, in a case where detection rule generator 140 has acquired the set of the communication ID and the client address at S804, detection rule generator 140 acquires a client count (a client count per communication ID) by referring to a row having a communication ID identical to the acquired communication ID within the advance setting detection rule stored in detection rule storage 130. Then, detection rule generator 140 acquires a type count of the client address by referring to the dynamic setting detection rule for the identical communication ID within the dynamic setting detection rule. Detection rule generator 140 performs S812 if the type count of the client address is lower than or equal to the client count (Yes at S811) or performs S814 if the type count of the client address is higher than the client count (No at S811).

(S812) In a case where detection rule generator 140 has acquired the set of the communication ID and the server address at S803, detection rule generator 140 adds, to the dynamic setting detection rule, a rule stating that, if a communication frame including the acquired communication ID is transmitted to or received from the acquired server address, such transmission and reception should be permitted (i.e., adds a rule that includes the set of the communication ID and the server address acquired at S803). In a case where detection rule generator 140 has acquired the set of the communication ID and the client address at S804, detection rule generator 140 adds, to the dynamic setting detection rule, a rule stating that, if a communication frame including the acquired communication ID is transmitted to or received from the acquired client address, such transmission and reception should be permitted (i.e., adds a rule that includes the set of the communication ID and the client address acquired at S804).

(S813) Detection rule generator 140 sets the communication establishment state to ON for every row registered at S812 (i.e., for every rule added at S812) and terminates the process.

(S814) Since the number of the servers connected to in-vehicle network system 10 or the number of the clients connected to in-vehicle network system 10 is greater than the prescribed maximum number of the servers or the prescribed maximum number of the clients, detection rule generator 140 determines that the received frame is anomalous on the basis that an illegitimate server or an illegitimate client has been added to in-vehicle network system 10 and an illegitimate dynamic setting detection rule has been generated. Then, detection rule generator 140 performs S815.

(S815) Detection rule generator 140 overwrites every row, within the dynamic setting detection rule stored in detection rule storage 130, that includes the communication ID determined to be anomalous at S814 (specifically, the communication ID for which the type count of the corresponding server address is higher than the server count per communication ID or the communication ID for which the type count of the corresponding client address is higher than the client count per communication ID) in a manner that makes every overwritten row identical to the row having the communication ID in the old dynamic setting detection rule held when in-vehicle network system 10 was started last time and stored in detection rule storage 130. Then, detection rule generator 140 terminates the process.

(S816) Detection rule generator 140 refers to a row, within the advance setting detection rule stored in detection rule storage 130, that has a communication ID identical to the communication ID acquired at S805 or S806. Detection rule generator 140 performs S818 if the current vehicle state acquired from vehicle state extractor 170 fails to match the vehicle state in the aforementioned row (No at S816) or performs S817 if the stated current vehicle state matches the vehicle state in the stated row (Yes at S816).

(S817) Detection rule generator 140 refers to a row, within the dynamic setting detection rule stored in detection rule storage 130, that has a communication ID identical to the communication ID acquired at S805 or S806. Detection rule generator 140 performs S819 if there is a set of a communication ID and a server address or a set of a communication ID and a client address that is identical to, respectively, the set of the communication ID and the server address acquired at S805 or the set of the communication ID and the client address acquired at S806 (Yes at S817) or performs S818 if there is no set of a communication ID and a server address or no set of a communication ID and a client address that is identical to, respectively, the set of the communication ID and the server address acquired at S805 or the set of the communication ID and the client address acquired at S806 (No at S817).

(S818) Detection rule generator 140 determines that the received communication establishment frame is an anomalous frame on the basis that the communication establishment frame has been transmitted in an improper vehicle state if the determination result is No at S816 or on the basis that, in the communication establishment phase, the service offer stop or the service subscription stop, which is supposed to be performed after the service offer or the service subscription has been performed, is being performed although the service offer or the service subscription has not been performed and that an illegitimate communication establishment frame has been transmitted if the determines result is No at S817. Then, detection rule generator 140 transmits the anomalous frame to anomaly notifier 160 and terminates the process.

(S819) In a case where detection rule generator 140 has acquired the set of the communication ID and the server address at S805, detection rule generator 140 sets, to OFF, the communication establishment state in the row, within the dynamic setting detection rule stored in detection rule storage 130, that includes the communication ID identical to the acquired communication ID and the server address and terminates the process. In a case where detection rule generator 140 has acquired the set of the communication ID and the client address at S804, detection rule generator 140 sets, to OFF, the communication establishment state in the row that includes the communication ID identical to the acquired communication ID and the client address and terminates the process. When detection rule generator 140 sets the communication establishment state to OFF, detection rule generator 140 sets the communication establishment state to OFF after having waited for a predetermined time of, for example but not limited to, one second.

(S820) In a case where detection rule generator 140 has acquired the set of the communication ID and the server address at S803, detection rule generator 140 sets, to ON, the communication establishment state in the row, within the dynamic setting detection rule stored in detection rule storage 130, that includes the set of the communication ID and the server address identical to the acquired set of the communication ID and the server address and terminates the process. In a case where detection rule generator 140 has acquired the set of the communication ID and the client address at S804, detection rule generator 140 sets, to ON, the communication establishment state in the row that includes the set of the communication ID and the client address identical to the acquired set of the communication ID and the client address and terminates the process.

[Flowchart of Anomaly Detecting Process]

FIG. 9 is a flowchart of the anomaly detecting process performed by anomaly detector 150 according to Embodiment 1 of the present disclosure.

(S901) Anomaly detector 150 receives a communication frame that includes a SOME/IP header from transferrer 120 and performs S902.

(S902) Anomaly detector 150 acquires the communication ID, the server address, and the client address by referring to the received frame. The communication ID is acquired based on MessageID written in the SOME/IP header, and the server address and the client address are acquired based on, respectively, the sender's IPv4 address and the receiver's IPv4 address written in the IPv4 header.

(S903) Anomaly detector 150 refers to a row, within the advance setting detection rule stored in detection rule storage 130, that has a communication ID identical to the communication ID acquired at S902. Anomaly detector 150 performs S905 if the current vehicle state acquired from vehicle state extractor 170 fails to match the vehicle state in the aforementioned row (No at S903) or performs S904 if the stated current vehicle state matches the vehicle state in the stated row (Yes at S903).

(S904) Anomaly detector 150 performs S905 if the dynamic setting detection rule stored in detection rule storage 130 includes a set of a communication ID, a server address, and a client address that is identical to the set of the communication ID, the server address, and the client address acquired at S902 (Yes at S904) or performs S906 if the dynamic setting detection rule stored in detection rule storage 130 includes no set of a communication ID, a server address, and a client address that is identical to the set of the communication ID, the server address, and the client address acquired at S902 (No at S904).

(S905) Anomaly detector 150 refers to the row, within the dynamic setting detection rule stored in detection rule storage 130, that includes the set of the communication ID, the server address, and the client address acquired at S902. Anomaly detector 150 terminates the process if the communication establishment state in that row is ON (Yes at S905) or performs S906 if the communication establishment state is OFF (No at S905).

(S906) Anomaly detector 150 determines that the received communication frame is an anomalous frame on the basis that the communication frame has been transmitted in an improper vehicle state if the determination result has been No at S903, on the basis that a frame that has not undergone the legitimate communication establishment phase has been transmitted if the determination result has been No at S904, or on the basis that a frame that is not permitted to be communicated has been transmitted if the determination result has been No at S905. Then, anomaly detector 150 transmits the anomalous frame to anomaly notifier 160 and terminates the process.

Other Embodiments

Thus far, Embodiment 1 has been described to illustrate the techniques according to the present disclosure. However, the techniques according to the present disclosure are not limited to the above and can also be applied to other embodiments that include modifications, substitutions, additions, omissions, and so on, as appropriate. For example, the following variations are also encompassed by an embodiment of the present disclosure.

(1) In the foregoing embodiment, security measures for an automobile have been described as an application example of the present disclosure, but the applicable range of the present disclosure is not limited to the above example. For example, the present disclosure may be applied not only to automobiles but also to movable bodies, such as construction machines, agricultural machines, ships, railroad vehicles, or aircrafts.

(2) In the foregoing embodiment, the server address and the client address are each an IPv4 address in the dynamic setting detection rule generated by detection rule generator 140 and stored in detection rule storage 130. Alternatively, the server address and the client address may each be an IPv6 address, a MAC address, a port number, an identification number of an ECU, the type of a communication protocol, or any combination of the above.

Moreover, the server address and the client address may each include CAN ID used in a frame exchanged over CAN or CAN-FD. In this case, CAN ID is stored in a communication frame of SOME/IP and communicated accordingly.

(3) In the foregoing embodiment, IDS ECU 100 is connected to Ethernet 13. Specifically, IDS ECU 100 may be incorporated as software or hardware into an Ethernet switch, an Ethernet hub, a gateway, or a router, or IDS ECU 100 may be incorporated as software or hardware into an ECU or a Zone ECU connected to an Ethernet switch, an Ethernet hub, a gateway, or a router via an Ethernet cable.

In a case where IDS ECU 100 is incorporated into an Ethernet switch, an Ethernet hub, a gateway, or a router, the Ethernet switch, the Ethernet hub, the gateway, or the router may block the anomalous frame after anomaly detector 150 has detected the anomalous frame.

In a case where IDS ECU 100 is incorporated into an ECU or a Zone ECU, an Ethernet switch, an Ethernet hub, a gateway, or a router may transfer all the packets to IDS ECU 100, so that IDS ECU 100 can receive all the packets on Ethernet 13 including a unicast packet.

(4) In the foregoing embodiment, information is exchanged between the ECUs over Ethernet 13 through frames that are in compliant with the SOME/IP protocol. Alternatively, such information may be exchanged in accordance with other service-oriented communication protocols or data-oriented communication protocols instead of the SOME/IP protocol. For example, such other data-oriented communication protocols include Data Distribution Service (DDS). In addition, REST communication or HTTP communication may be carried out. In this case, a detection rule is generated not per service but per data.

(5) In the foregoing embodiment, anomaly notifier 160 notifies the driver or the police of an anomaly. Alternatively, the notification destination may be a server connected to the vehicle, the Department of Transportation, any approaching vehicle, a traffic system, or an organization that shares vulnerability information and the like.

(6) A part or the whole of the constituent elements included in each device according to the foregoing embodiment may be implemented by a single system large scale integration (LSI). A system LSI is an ultra-multifunctional LSI manufactured by integrating a plurality of components on a single chip and is specifically a computer system that includes a microprocessor, a ROM, a RAM, and so on. The RAM has a computer program recorded therein. The microprocessor operates in accordance with the computer program, and thus the system LSI implements its functions.

The constituent elements of each device described above may each be implemented by a single chip, or a part or the whole of such constituent elements may be implemented by a single chip.

Although the term a system LSI is used above, depending on the difference in the degree of integration, it may also be called an IC, an LSI, a super LSI, or an ultra LSI. The technique for circuit integration is not limited to the LSI, and an integrated circuit may be implemented by a dedicated circuit or a general purpose processor. A field programmable gate array (FPGA) that can be programmed after an LSI is manufactured or a reconfigurable processor in which the connection or the setting of the circuit cells within the LSI can be reconfigured may also be used.

Furthermore, when a technique for circuit integration that replaces the LSI appears through the advancement in the semiconductor technology or through a derived different technique, the functional blocks may be integrated by use of such different techniques. An application of biotechnology is a possibility.

(7) A part or the whole of the constituent elements in each device described above may be implemented by an IC card or a single module that can be attached to or detached from each device. The IC card or the module is a computer system that includes a microprocessor, a ROM, a RAM, and so on. The IC card or the module may include the ultra-multifunctional LSI described above. The microprocessor operates in accordance with a computer program, and thus the IC card or the module implements its functions. The IC card or the module may be tamper resistant.

(8) The present disclosure can be implemented not only in the form of an anomaly detection device but also as an anomaly detection method that includes the steps (the processes) performed by the constituent elements of the anomaly detection device.

The anomaly detection method is an anomaly detection method in an in-vehicle network system performing service-oriented communication via Ethernet (registered trade mark). The anomaly detection method includes a detection rule generating step of monitoring a communication establishment frame flowing over the Ethernet in a communication establishment phase of the service-oriented communication and generating, for each communication ID, a detection rule including the communication ID written in the communication establishment frame and a server address or a client address written in the communication establishment frame (S609 in FIG. 6); an anomaly detection step of monitoring a communication frame flowing over the Ethernet in a communication phase of the service-oriented communication and, by referring to a detection rule that includes a communication ID written in the communication frame, detecting the communication frame as an anomalous frame when a server address or a client address written in the communication frame differs from a server address or a client address included in the detection rule (S706 in FIG. 7); and an anomaly notifying step of providing a notification of an anomaly in response to detecting the anomalous frame (S707 in FIG. 7).

The steps in the anomaly detection method may be executed by a computer (a computer system). Moreover, the present disclosure can be implemented in the form of a program (a computer program) that causes a computer to execute the steps included in the anomaly detection method or in the form of digital signals composed of the computer program.

One aspect of the present disclosure can be implemented in the form of a non-transitory computer readable recording medium having the aforementioned computer program or the aforementioned digital signals recorded therein, and examples of such a non-transitory computer readable recording medium include a flexible disk, a hard disk, a CD-ROM, an MO, a DVD, a DVD-ROM, a DVD-RAM, a Blue-ray (BD) (registered trademark) disc, and a semiconductor memory.

In one aspect of the present disclosure, the computer program or the digital signals may be transmitted via an electric communication circuit, a wireless or wired communication circuit, a network represented by the internet, data broadcast, or the like.

One aspect of the present disclosure may provide a computer system that includes a microprocessor and a memory. The memory may have the computer program described above recorded therein, and the microprocessor may operate in accordance with the computer program.

Alternatively, the program or the digital signals may be recorded into a recording medium, which then may be transported, or the program or the digital signals may be transported via a network or the like. Thus, the program or the digital signals may be executed by a separate stand-alone computer system.

(9) An embodiment obtained by combining the constituent elements and the functions illustrated in each of the foregoing embodiments as desired is also encompassed by the scope of the present disclosure.

INDUSTRIAL APPLICABILITY

The present disclosure can find its use in an in-vehicle network system that uses service-oriented communication.

The invention claimed is:

1. An anomaly detection device in an in-vehicle network system performing service-oriented communication via Ethernet (registered trade mark), the anomaly detection device comprising:
   a detection rule generator circuit
      that monitors a communication establishment frame flowing over the Ethernet in a communication establishment phase of the service-oriented communication, the communication establishment frame including a communication ID, and
      that dynamically generates, for the communication ID, a detection rule including the communication ID written in the communication establishment frame, and a server address or a client address written in the communication establishment frame;
   an anomaly detector circuit
      that monitors a communication frame flowing over the Ethernet in a communication phase of the service-oriented communication,
      that determines that the communication frame includes the communication ID corresponding to the dynamically generated detection rule,
      that, by referring to the dynamically generated detection rule corresponding to the communication ID written in the communication frame, detects the communication frame as an anomalous frame when a server address or a client address written in the communication frame differs from the server address or the client address specified in the dynamically generated detection rule; and
   an anomaly notifier circuit that provides a notification of an anomaly in response to the anomalous frame being detected, wherein
   the detection rule generator circuit generates, for each of one or more communication IDs, a plurality of detection rules that include an identical communication ID and server addresses different from each other or client addresses different from each other.

2. The anomaly detection device according to claim 1, wherein
   the anomaly detector circuit, by referring to a plurality of detection rules that include the communication ID written in the communication frame, detects the communication frame as an anomalous frame when the server address or the client address written in the communication frame differs from any of the server addresses or any of the client addresses included in the plurality of detection rules.

3. The anomaly detection device according to claim 1, wherein
   a detection rule includes a communication establishment state, the communication establishment state being ON when a server corresponding to a server address included in the detection rule or a client corresponding to a client address included in the detection rule is in a state of performing communication concerning a service corresponding to a communication ID included in the detection rule, the communication establishment state being OFF when the server corresponding to the server address included in the detection rule or the client corresponding to the client address included in the detection rule is not in a state of performing communication concerning the service corresponding to the communication ID included in the detection rule,
   the detection rule generator circuit:
      checks a communication type written in the communication establishment frame;
      sets, to ON, the communication establishment state included in the detection rule that includes a set of the communication ID and the server address written in the communication establishment frame or a set of the communication ID and the client address written in the communication establishment frame, when the communication type is a service offer, a service subscription acknowledgment, a service search, or a service subscription; and
      sets, to OFF, the communication establishment state included in the detection rule that includes the set of the communication ID and the server address written in the communication establishment frame or the set of the communication ID and the client address written in the communication establishment frame, when the communication type is a service offer stop or a service subscription stop, and
   the anomaly detector circuit, by referring to the detection rule that includes the communication ID written in the communication frame, detects the communication frame as an anomalous frame when the server address or the client address written in the communication frame matches the server address or the client address included in the detection rule and when the communication establishment state included in the detection rule is OFF.

4. The anomaly detection device according to claim 3, wherein
   the detection rule generator circuit sets, to OFF, the communication establishment state included in the detection rule that includes the set of the communication ID and the server address written in the communication establishment frame or the set of the communication ID and the client address written in the communication establishment frame after having waited for a predetermined time, when the communication type is the service offer stop or the service subscription stop.

5. The anomaly detection device according to claim 3, wherein
   the detection rule generator circuit:
      checks the communication type written in the communication establishment frame;

checks whether there is a detection rule that includes the set of the communication ID and the server address written in the communication establishment frame when the communication type is the service offer stop, and determines that the communication establishment frame is anomalous when the detection rule does not exist; and checks whether there is a detection rule that includes the set of the communication ID and the client address written in the communication establishment frame when the communication type is the service subscription stop, and determines that the communication establishment frame is anomalous when the detection rule does not exist.

6. The anomaly detection device according to claim 1, wherein
the anomaly detection device stores in advance at least one of a server count per communication ID or a client count per communication ID in the in-vehicle network system, the server count per communication ID indicating a maximum number of servers to be used for each communication ID, the client count per communication ID indicating a maximum number of clients to be used for each communication ID, and
the detection rule generator circuit:
checks whether there is a detection rule that includes the set of the communication ID and the server address written in the communication establishment frame, and when the detection rule does not exist, determines that the communication establishment frame is anomalous when a type count of the server address in a detection rule that includes the communication ID is higher than the server count per communication ID, or
adds a detection rule that includes the set of the communication ID and the server address written in the communication establishment frame when the type count of the server address in the detection rule that includes the communication ID is equal to or lower than the server count per communication ID; or
checks whether there is a detection rule that includes the set of the communication ID and the client address written in the communication establishment frame, and when the detection rule does not exist, determines that the communication establishment frame is anomalous when a type count of the client address in a detection rule that includes the communication ID is higher than the client count per communication ID, or
adds a detection rule that includes the set of the communication ID and the client address written in the communication establishment frame when the type count of the client address in the detection rule that includes the communication ID is equal to or lower than the client count per communication ID.

7. The anomaly detection device according to claim 6, wherein
the anomaly detection device stores a previous detection rule generated when started last time, and
in response to determining that the communication establishment frame is anomalous when the detection rule generator circuit monitors the communication establishment frame to generate a detection rule, the detection rule generator circuit refers to a previous detection rule that includes the communication ID written in the communication establishment frame and overwrites content written in the detection rule that includes the communication ID with content written in the previous detection rule.

8. The anomaly detection device according to claim 1, wherein
the anomaly detection device stores in advance a vehicle state in which communication is permitted for each communication ID,
the detection rule generator circuit acquires a current vehicle state in response to receiving the communication establishment frame, and determines that the communication establishment frame is anomalous when the current vehicle state differs from the vehicle state in which the communication is permitted as stored in advance for the communication ID written in the communication establishment frame, and
the anomaly detector circuit acquires a current vehicle state in response to receiving the communication frame, and detects the communication frame as an anomalous frame when the current vehicle state differs from the vehicle state in which the communication is permitted as stored in advance for the communication ID written in the communication frame.

9. The anomaly detection device according to claim 8, wherein
the vehicle state includes at least one of an ignition state, a network connection state, a gearshift state, a drive assist mode state, an automatic driving state, or a person or object detection state.

10. The anomaly detection device according to claim 1, wherein
SOME/IP is used in the communication phase of the service-oriented communication,
SOME/IP-SD is used in the communication establishment phase of the service-oriented communication,
the communication ID includes ServiceID and MethodID, and
a service offer, a service subscription, a service search, a service subscription acknowledgment, a service offer stop, and a service subscription stop in a communication type are, respectively, ServiceOffer, ServiceSubscribe, ServiceFind, ServiceSubscribeAck, StopOffer, and StopSubscribe.

11. An anomaly detection method in an in-vehicle network system performing service-oriented communication via Ethernet (registered trade mark), the anomaly detection method comprising:
monitoring a communication establishment frame flowing over the Ethernet in a communication establishment phase of the service-oriented communication, the communication establishment frame including a communication ID,
dynamically generating, for the communication ID, a detection rule including the communication ID written in the communication establishment frame, and a server address or a client address written in the communication establishment frame;
monitoring a communication frame flowing over the Ethernet in a communication phase of the service-oriented communication;
determining that the communication frame includes the communication ID corresponding to the dynamically generated detection rule;
by referring to the dynamically generated detection rule corresponding to the communication ID written in the communication frame, detecting the communication frame as an anomalous frame when a server address or a client address written in the communication frame differs from the server address or the client address specified in the dynamically generated detection rule;
providing a notification of an anomaly in response to detecting the anomalous frame; and
generating, for each of one or more communication IDs, a plurality of detection rules that include an identical communication ID and server addresses different from each other or client addresses different from each other.

* * * * *